US008818990B2

(12) United States Patent
Hobson et al.

(10) Patent No.: US 8,818,990 B2
(45) Date of Patent: Aug. 26, 2014

(54) METHOD, APPARATUS AND COMPUTER PROGRAM FOR RETRIEVING DATA

(75) Inventors: Stephen J. Hobson, Middlesex (GB); Stephen J. Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 3090 days.

(21) Appl. No.: 10/914,705

(22) Filed: Aug. 9, 2004

(65) Prior Publication Data
US 2005/0071366 A1 Mar. 31, 2005

(30) Foreign Application Priority Data

Sep. 30, 2003 (GB) .................................. 0322844.2

(51) Int. Cl.
*G06F 17/30* (2006.01)

(52) U.S. Cl.
USPC .......................................... 707/714; 707/715

(58) Field of Classification Search
USPC ............................... 707/5, 3, 104.1, 714, 715
See application file for complete search history.

(56) References Cited

U.S. PATENT DOCUMENTS

| 5,423,035 | A | * | 6/1995 | DePrez ............................... 707/2 |
| 6,058,392 | A | * | 5/2000 | Sampson et al. .................... 707/6 |
| 6,345,266 | B1 | | 2/2002 | Ganguly et al. ..................... 707/1 |
| 6,547,829 | B1 | | 4/2003 | Meyerzon et al. ........... 715/501.1 |
| 6,631,373 | B1 | * | 10/2003 | Otani et al. ........................ 707/5 |
| 2002/0078087 | A1 | | 6/2002 | Stone et al. ..................... 715/511 |
| 2002/0133476 | A1 | * | 9/2002 | Reinhardt .......................... 707/1 |
| 2003/0005233 | A1 | | 1/2003 | Stewart et al. ................. 711/136 |
| 2004/0220923 | A1 | * | 11/2004 | Nica .................................. 707/3 |
| 2005/0203940 | A1 | * | 9/2005 | Farrar et al. .................... 707/102 |

OTHER PUBLICATIONS

Praveen Seshadi and Arun Swami, Generalized Partial Indexes, Jan. 1, 1995, IEEE.*
Paul M Aoki "Partial Indices", website http://kuya.vism.org/docs/pgsql/postgres/partial-index.html.
Zaval User's Guide, website http://www.zaval.org/products/file-search/user_guide.
Michael Stonebraker "The Case for Partial Indexes".
Carey et al "Designing the B-1—A Universal System for Information".
James R Hamilton "Operational Data Storage Unification", Jul. 6, 1997, pp. 1-20.
Operational Data Storage Unification (Hamilton) Jul. 6, 1997. Retrieved on the Apr. 16, 2004 via http://www.cs.uwaterloo.ca/cs-archive/CS-1997/16/intsto~1.pdf.

* cited by examiner

*Primary Examiner* — Etienne Leroux
*Assistant Examiner* — Fariborz Khoshnoodi
(74) *Attorney, Agent, or Firm* — Steven M. Greenberg, Esq.; CRGO Law

(57) ABSTRACT

A data item is retrieved from a data store in a data processing system. The data processing system comprises an index, which at least partially indexes the data store, and also a partiality definition store. The partiality definition store indicates a part of the data store which is referenced by the partial index. A request is received for a data item from the data store and responsive to determining that the requested data item is not referenced by the partial index, the data store is searched by using the partiality definition store to avoid searching a part of the data store which is known to be indexed.

36 Claims, 7 Drawing Sheets

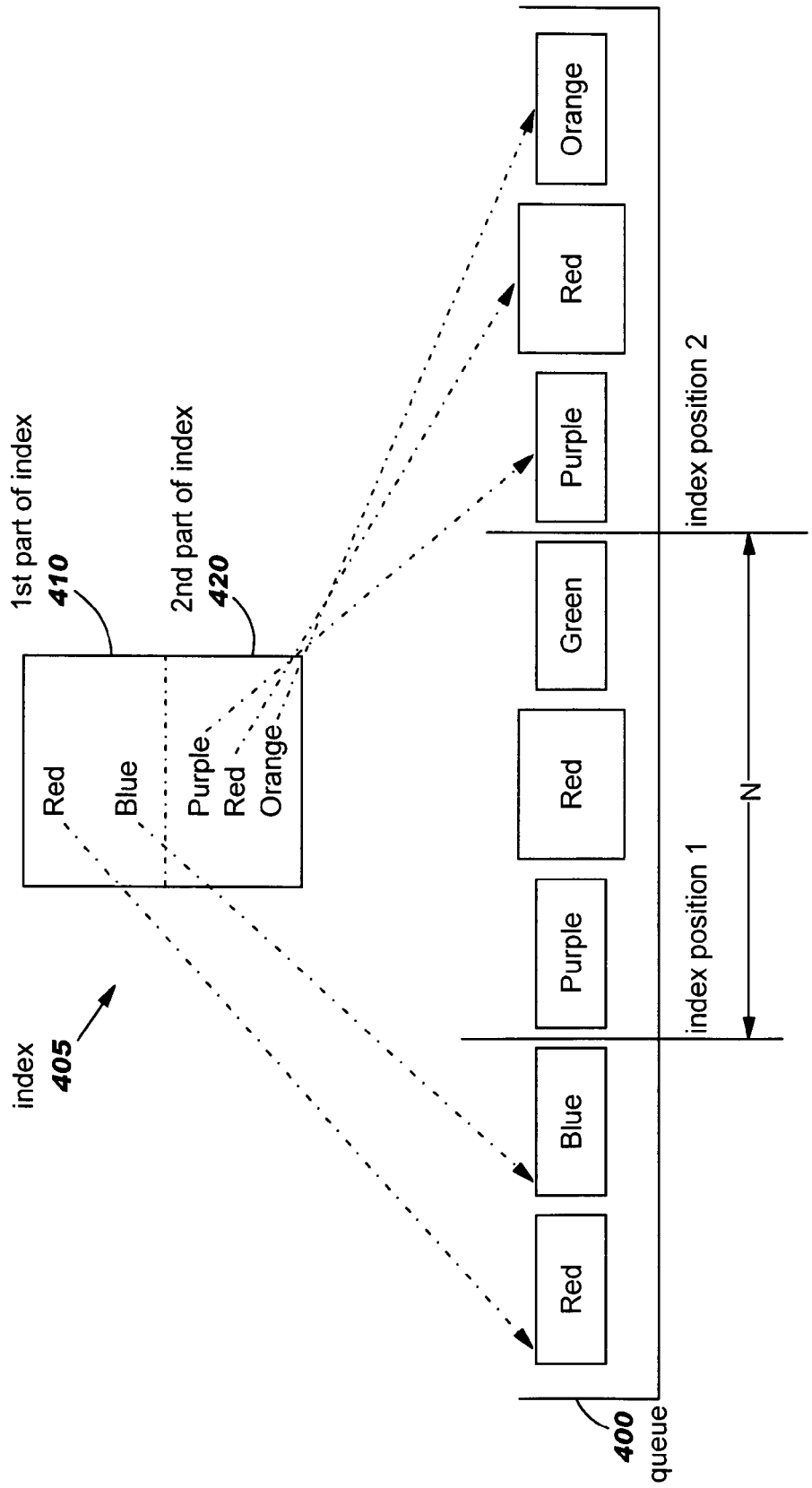

METHOD, APPARATUS AND COMPUTER PROGRAM FOR RETRIEVING DATA

BACKGROUND OF THE INVENTION

The present invention relates to data retrieval and more particularly to data retrieval using an index.

Data retrieval may be facilitated via the use of an index which is typically based on one or more keys defining search criteria which can be used to access stored data. Such an index may, for example, chart the location of data stored within records in a database system or messages held by a messaging system. Some systems build a full index upfront of all the data stored and add to this as and when changes are made to the data.

In systems which build an index dynamically, the index is typically built based on the data that a user retrieves. In this way storage space is not wasted and the index should be tailored towards the most common user requests.

BRIEF SUMMARY OF THE INVENTION

According to one aspect of the present invention, a method is set forth for retrieving a data item from a data store in a data processing system. The data processing system may comprise an index which at least partially indexes the data store and a partiality definition store. The partiality definition store may indicate a part of the data store which is referenced by the partial index. The method comprises receiving a request for a data item from the data store, and searching the data store using the partiality definition store in response to determining that the requested data item is not referenced by the partial index.

According to another aspect of the present invention, a computer program product for retrieving a data item from a data store in a data processing system is set forth. The data processing system may comprise an index which at least partially indexes the data store and a partiality definition store. The partiality definition store may indicate a part of the data store which is referenced by the partial index. The computer program product comprises a computer readable medium having computer readable program code embodied therein. The computer readable program code comprises computer readable program code configured to receive a request for a data item from the data store, and computer readable program code configured to search the data store using the partiality definition store in response to determining that the requested data item is not referenced by the partial index.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 4 illustrates another aspect of present invention;

DETAILED DESCRIPTION OF THE INVENTION

Figure 1:
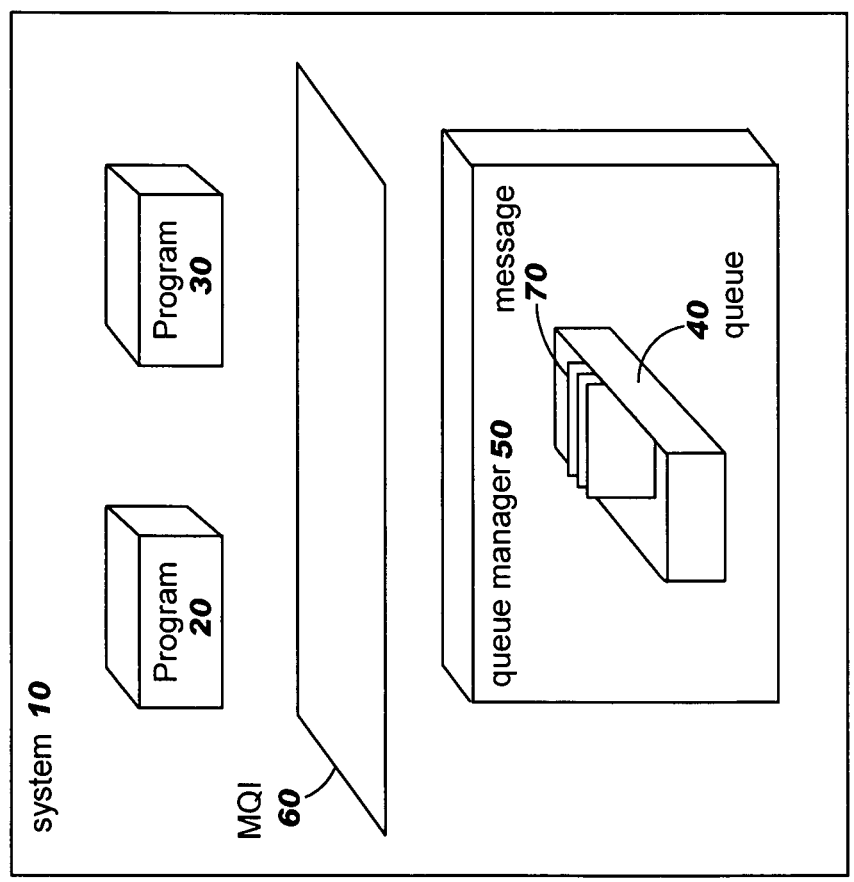
FIG. 1 illustrates a typical messaging system in accordance with the prior art.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Messaging systems such as IBM's WebSphere® MQ family of products allow keyed retrieval of messages. Such systems will typically allow an administrator to specify index requirements such as which queue(s) to index and which attribute (e.g. message identifier or correlation identifier) to index on.

If no index requirements have been specified then keyed retrieval may be achieved by sequentially searching the queue for a message with matching attribute value(s). Use of an index however may improve performance by converting the key to the location(s) of message(s) with a matching key. In this way the message can be found directly via the index.

According to one aspect of the present invention, such an index may be built dynamically. FIG. 1 illustrates a typical messaging system in accordance with the prior art. Such a messaging system may be used in carrying out certain aspects of the present invention. It will be appreciated by those skilled in the art that other messaging systems may be used in carrying out certain aspects of the present invention.

Referring to FIG. 1, a messaging system 10 may execute programs 20 and 30. Programs 20 and 30 may communicate with a queue 40 running on queue manager 50 via a message queuing interface (MQI) 60. For example, program 20 may wish to put a message 70 to queue 40 for retrieval by program 30. Program 30 may use an index (not shown) to aid retrieval of such a message from the queue 40.

Figure 2:
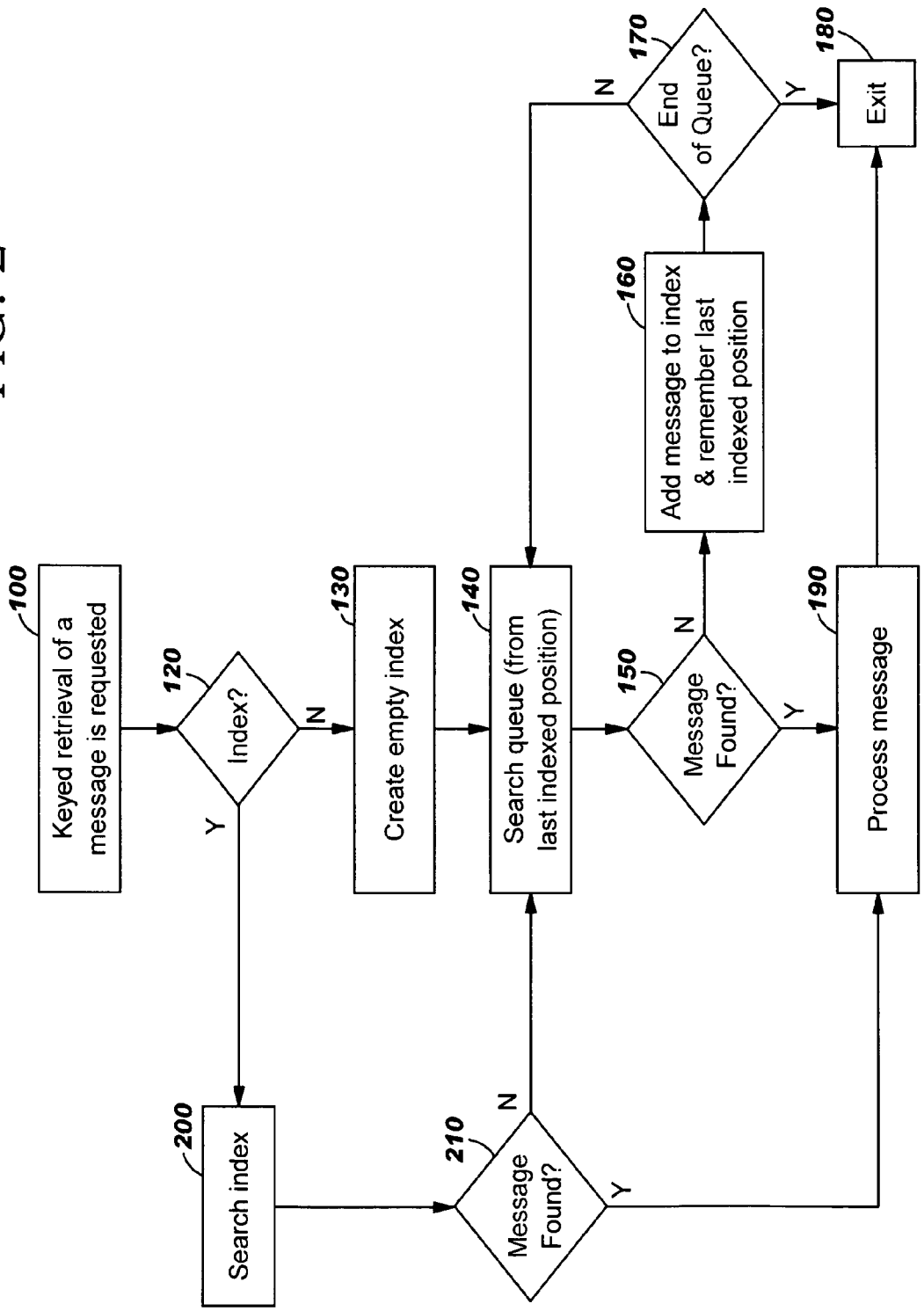
FIG. 2 is a flowchart illustrating one aspect of the present invention.

With reference to FIG. 2, program 30 makes a request for keyed retrieval of a message from queue 40 (step 100). For example, program 20 may issue an MQGET on message identifier x. At step 110, it is determined whether an index exists for the specified attribute (e.g. message identifier). Note, in the initial state (including the state immediately following restart after queue manager failure) there will be no index for the queue.

If an appropriate index does not exist, then an empty index is created at step 130. If the index does exist, then it is searched at step 200 for the specified attribute value. If the attribute is found in the index, then this is used to locate the corresponding message and to process the message as required (steps 210, 190).

On the other hand, if the message is not found in the index, then the queue itself is searched sequentially (step 140). This is also the case, if no index existed and one had to be created at step 130.

In searching the queue, each message is examined (browsed) in turn in order to locate the requested message. If the particular message being examined is the requested message, then it is processed as required at step 190. If the particular message being examined is not the requested message, then the message is added to the index (step 160). Note, optionally even if the message examined is the requested message it may be added to the index (this is useful in situations where the requested message is not removed from the queue—e.g. the request was a browse request).

This process loops round until either all messages on the queue have been examined without success (steps 170, 180) or the requested message has been found and processed (steps 150, 190, 180).

Note, every time a message is added to the index, this entry in the index is remembered as the last indexed position. In this way if a message is not found in the index, it is not necessary to start searching the queue from the beginning. Instead the queue can be searched from the last indexed position. This is because the index is built from the head of the queue, whilst messages are added to the tail of the queue. If a requested message is not in the index, then it does not exist prior to the last indexed position.

Figure 3:
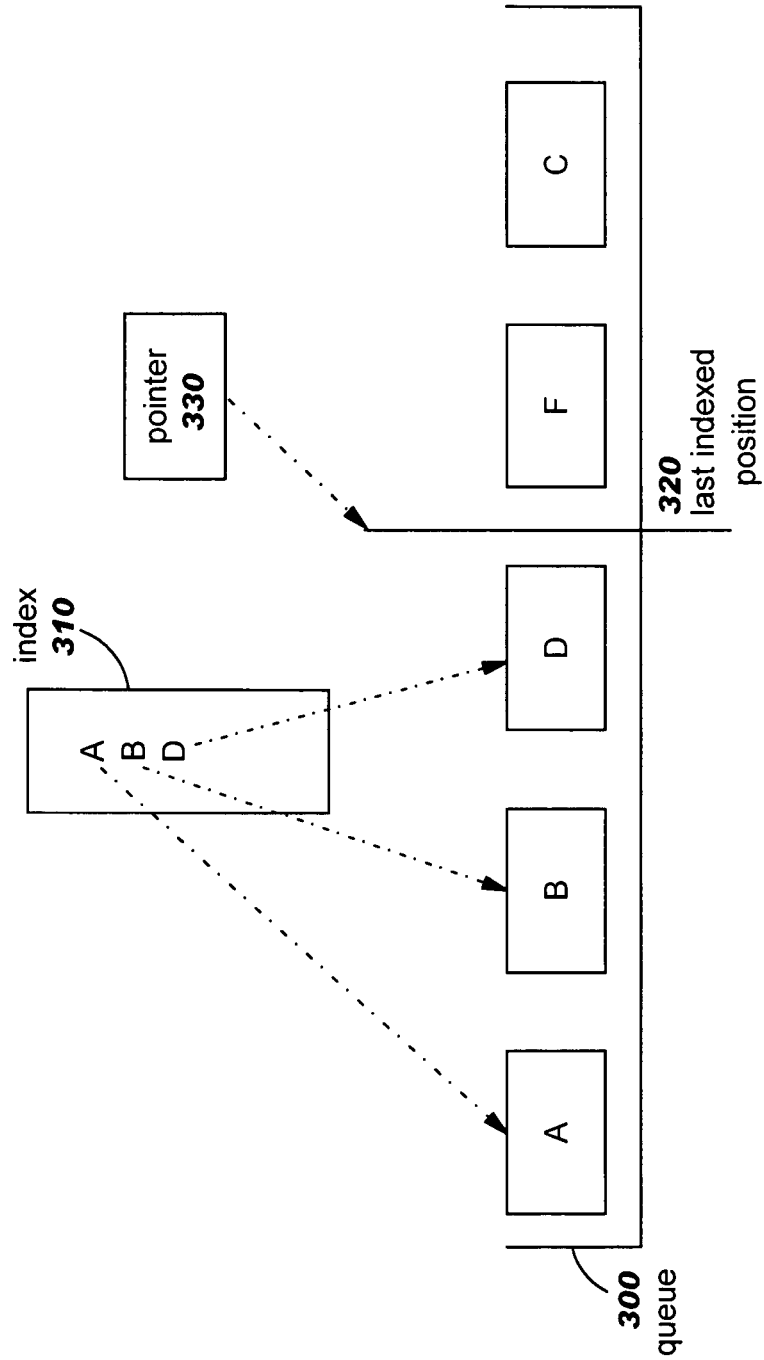
FIG. 3 illustrates components that may carry out the process of FIG. 2.

Referring now to FIG. 3, a queue 300 has messages A, B, D, F and C on it. The queue has previously been scanned and messages A, B and D added to an index 310. The index may include each message's identifier and a pointer to the actual location of the particular message. There is also a pointer 330 to the last indexed position 320. Suppose now that a process wishes to retrieve message C. The index 310 is first examined to determine whether the message exists therein.

Now the pointer 330 which is associated with the index 310 can be used to retrieve messages not identified by the index. All messages prior to the last indexed position 320 will exist in the index. It has however already been determined that the required message does not exist in the index. Thus rather than searching the queue from the very beginning, the queue now need only be searched from last indexed position 320. Thus in this example, it is only necessary to search 2 messages (F and C) rather than 5 messages (A, B, D, F and C).

Note, it will be appreciated that in the messaging environment it is often inefficient to maintain an index for a queue since the queue will typically not contain enough messages. It is therefore preferable to verify the depth of the queue before creating an index and only creating one if the queue is deeper than a predetermined threshold. Also, the small overhead of index maintenance may become not worthwhile as a queue becomes small. For example if the message consumer has been offline for a time, the queue may build up and become worth indexing; but when the consumer returns the queue fairly quickly becomes small. At this point, the partial dynamic index should be dispensed with.

It will be appreciated that the pointer 330 may distinguish between the first part of the queue (which is indexed) and the latter part of the queue (which is not). For consistency of terminology herein this pointer will be known as the partiality definition store.

Note, there is no discussion herein regarding the structure that should be used to implement the index. Any standard indexing technique may be used as appropriate. For example, the index may be held as a sequential summary of the records indexed; this requires index scanning, but such scanning is much cheaper than scan of the full message data. Alternatively, structures such as hashtables or b-trees may be used.

For some patterns of queue usage, in addition to building indexes from the front as just described, insert requests also build the index from the back as new messages arrive. The two parts of the index can be kept separate (i.e. the part built as a result of scanning the index from the head of the queue; and the part expanded as and when messages are added to the tail of the queue). With this optimization, a second pointer is maintained. This second pointer indicates the first message added to the second part of the index.

FIG. 4 provides one example of this optimization. In this figure, there is shown a queue 400 with a number of messages thereon which are to be indexed by color. An index 405 charts the location of messages on the queue. As a message is searched for from the head of the queue, non-matching messages are added to the first part of the index 410. Index position 1 denotes the location of the last message added to the first part of the index 410. As messages are added to the tail of the queue, these are entered into the second part of the index 420. Index position 2 indicates the position of the first message entered into index part 420.

Commonly a user requesting a message will desire the first message of that type—e.g. the first purple message. In this case, if the first part of the index 410 does not give an appropriate message, the system must start to scan unindexed section N. This will correctly yield the first purple message from section N.

However, where neither the first index 410 nor the unindexed section N yields a result, the second index 420 may be used to avoid a scan of the second indexed section. Thus, a request for the first Orange message will need to scan the unindexed section N, but will not need to scan either indexed section (instead the index itself may be used to locate the orange message).

On the other hand, there are occasions when it does not matter as long as a message of type x is retrieved (this will be indicated by the requester). In this case the whole of the index 410, 420 can be used to locate messages before it becomes necessary to scan the unindexed section N (i.e. if the requested message is not found in the index).

Assuming the whole of the index is useable, then pointers 1 and 2 can both be used to aid message retrieval. If a message does not exist in either parts of the index, then only the part of the queue between the two pointers need be searched (i.e. part N). For example, a green message may be requested. The index 405 does not hold any entry regarding such a message and thus this indicates that no messages to the left of index 1 and to the right of index 2 are green. It is therefore only necessary to scan part N. In this way, only two messages instead of five messages need be scanned. Note, as part N is scanned messages are added to the index. Thus index position 1 is moveable, but index position 2 remains fixed. When the two index positions meet, the whole of the queue is indexed and the two index sections are merged. In this example, it is the combination of the two pointers index position 1 and index position 2 that constitutes the partiality definition store.

The present invention may also be applicable to a database environment. A database includes a plurality of records stored in memory pages. New records are typically inserted at the end of the database. Thus as with a messaging system, an index can be built dynamically and tailored to particular user requirements.

If an index does not exist, then the database is scanned from the very beginning and each non-matching record is entered into an index. A pointer is maintained to indicate the last indexed record. Once again this removes the need for database to be searched from the very beginning if an appropriate index entry does not exist. Instead the database can be searched from the last indexed point.

It is also possible to expand the index as records are added to the end of the database. Once again an index of two parts and also two pointers are maintained. The first pointer indicates the last indexed position, and the second indicating the first record added to the second part of the index.

Suppose a user is searching for a record referring to a person with "blue eyes." If the user requires the first record referring to blue eyes, then as with the messaging embodiment, the first part of the index should be scanned first, then the part of the data store existing between the pointers and then the second part of the index. If, on the other hand, the user does not have such a requirement, then the whole of the index can be used before it is necessary to resort to scanning the data store itself.

Where the database implements the insertion or update of records in place, an update into a segment of the database already indexed may require an associated update of the partial index. This partial index update will behave in the same manner as an update to a full index in the prior art. The partiality definition store may hold two pointers to indicate the indexed areas of data at the start and end of the entire data store.

It is common in databases to have several indices on the same data. This means that data held in data pages is accessed much more randomly than is typical in a messaging system. For example, a majority of accesses to a user table in a database may be on name or personnel number, so these fields will be permanently indexed in the conventional manner. However, it may sometimes become worthwhile to create partial indices on other attributes; for example if a study is being made on eye color a temporary partial index may be built on eye color. As standard queries are made on name or number, data pages containing user records will be retrieved. As each page is available, the opportunity may be taken to enhance the eye color partial index with information for all records on a retrieved page.

Figure 5A:
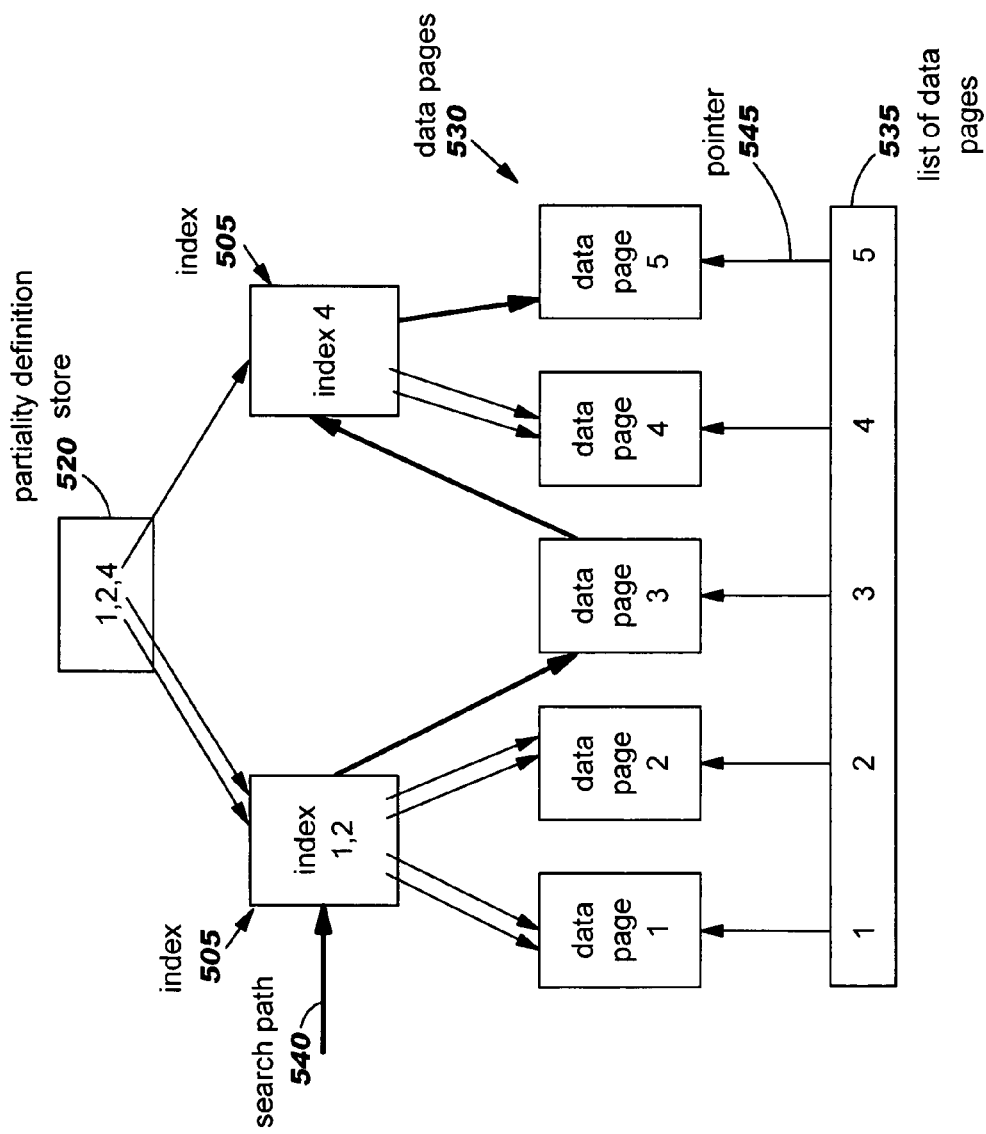
FIG. 5a illustrates yet another aspect of the present invention.
Figure 5B:
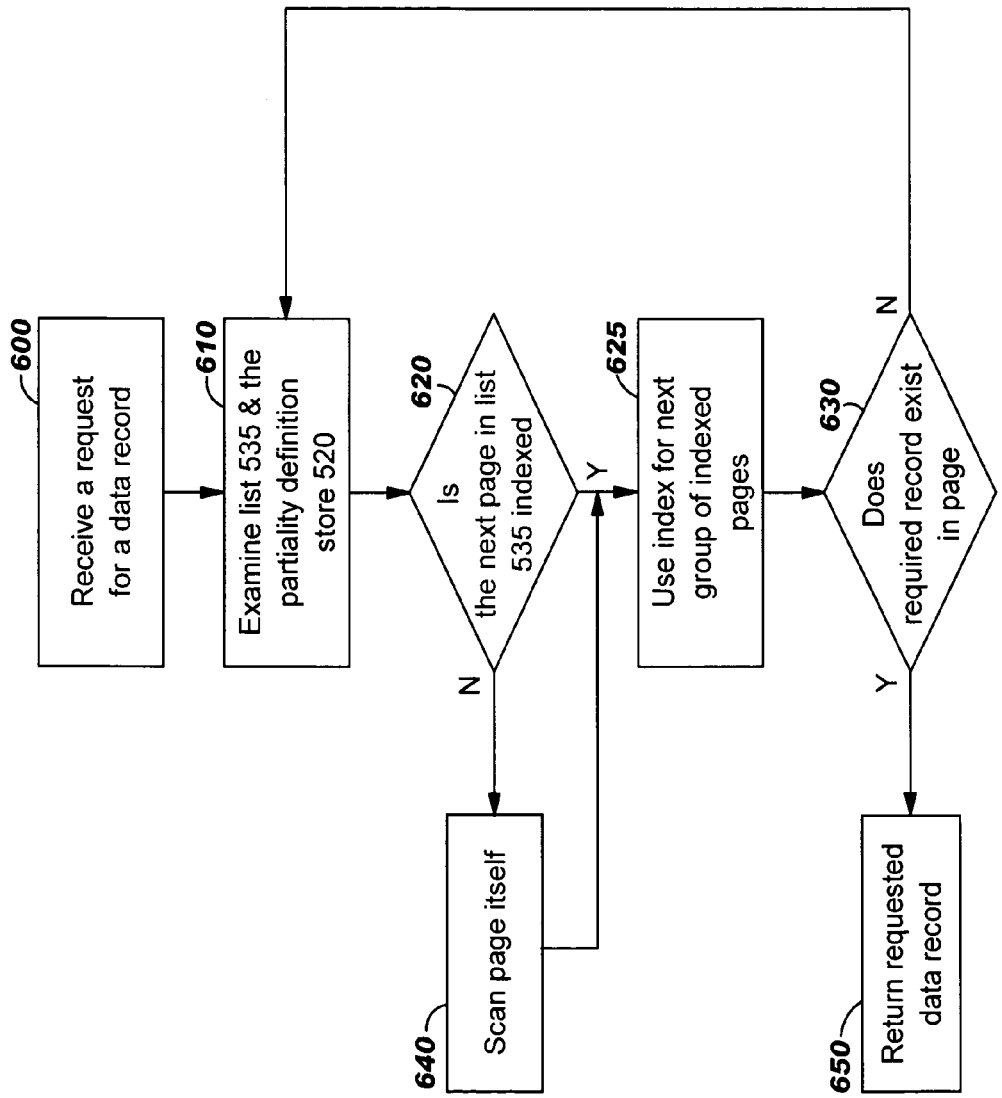
FIG. 5b is a flowchart illustrating yet another aspect of the present invention.

With reference to FIGS. 5a and 5b, a database system (not shown) includes a number of pages 530, each including a number of records (also not shown). A complete list 535 of all the pages stored is held in memory and each page entry contains a pointer 545 to the relevant stored page.

In order to aid retrieval of records held by the pages, an index 505 is maintained and the relevant location of the indexed record in the data store is pointed to. As discussed with respect to messaging, there may be cases where queries are expected to return results in an order corresponding to the underlying order of the stored data (i.e. a user may require the first record of a certain type to be returned). In this case, the index may be segmented. Accordingly, a segment may be for a single page (e.g. page 4) or a sequential set of pages (e.g. pages 1 and 2).

As described above, the partial index 505 referred to either one or two sequential sections of data. Here, the partial index represents the indexation of a fragmented set of pages. Thus, it is no longer adequate to hold just one or two pointers to remember which data is indexed. Instead partiality definition store 520 consists of a list of index data page identifiers.

A search is conducted using the index 505 for pages which are indexed, and by page scan for pages that are not indexed. The overall search 540 may include interleaved processing of indexed and non-indexed data, with the partiality definition store 520 and the list 535 used to guide this interleaving.

FIG. 5b illustrates the processing that may take place on receipt of a request. A request for the first record referring to a person with blue eyes is received (step 600). In this example that record exists within page 5.

List 535 and partiality definition store 520 are examined (step 610). From this it is determined whether the next page stored by the database system is indexed (step 620) (an indexed page may reference and point to multiple records). In this example, page 1 is the first page in list 535 and this page also exists within partiality definition store 520—in other words, this page is indexed. The index is thus used to determine whether the group of pages held by the particular index segment containing for example page 1 and 2 has a record matching the search criterion (625, 630). In this instance the answer is no and so the process repeats itself (step 610). Again the partiality definition store 520 and list 535 are examined (step 610) and it is determined at step 620 that next page (page 3) is not indexed. In this case, the page itself is scanned (browsed) for a relevant record (step 640). Once again this page does not contain a relevant record (step 630) and the process loops round. List 535 and partiality definition store 520 are again examined (step 610) and it is determined that the next page (page 4) is indexed (step 620) and consequently the index is used to determine whether a relevant record exists therein (steps 625 and 630). In this way the search path 540, denoted by the thick arrow in FIG. 5a is followed, until a relevant record is found in page 5 and the record is returned to the requestor (step 650).

Figure 6:
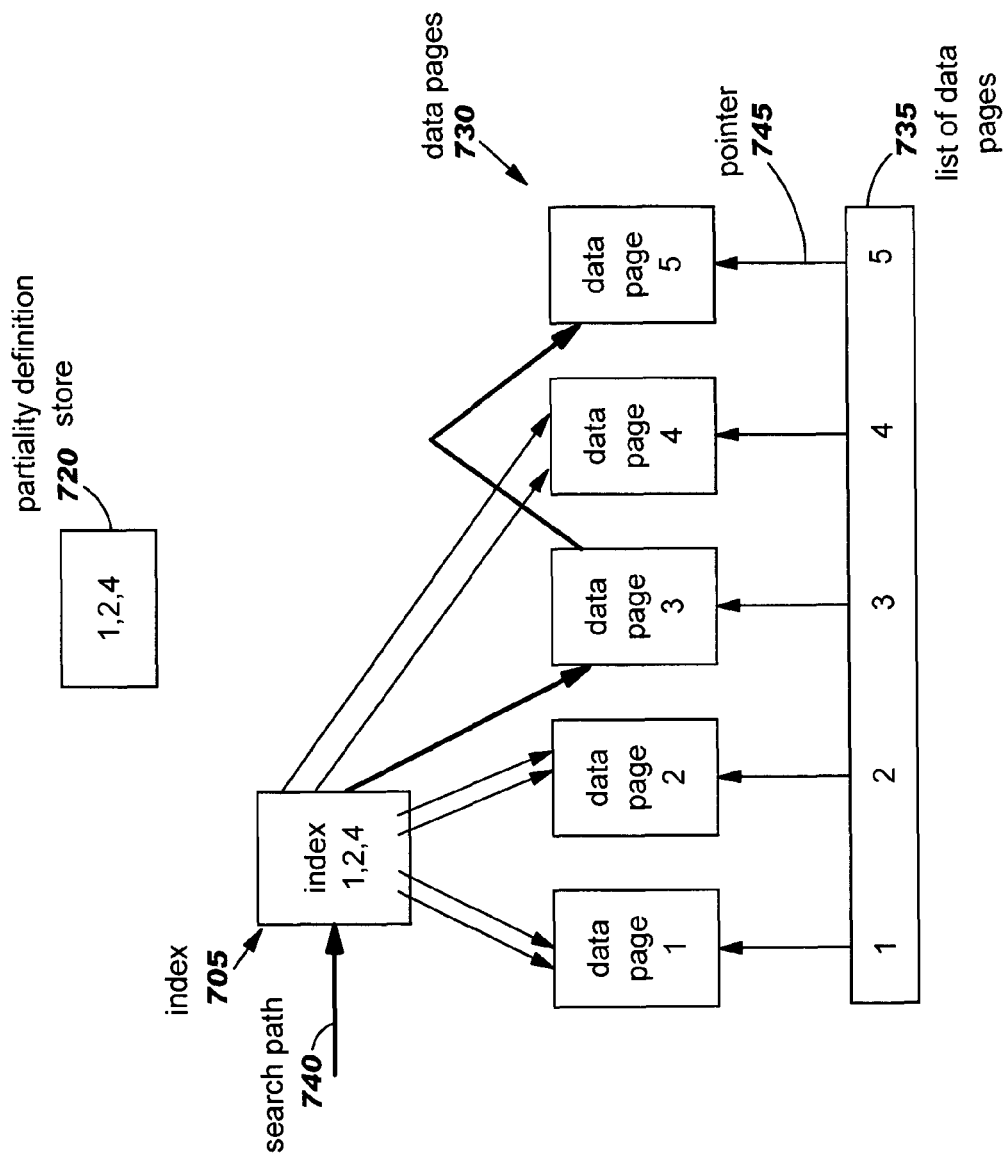
FIG. 6 illustrates a still further aspect of the present invention.

While FIGS. 5a and 5b illustrate the processing when ordering is a requirement, in database operations it is possible for the query result to have no special order. Referring now to FIG. 6, a single index 705 may be kept representing all indexed pages. The search 740 first checks this index and returns records accordingly. Where no record (or insufficient records) are found to satisfy the query, the non-indexed pages (3,5) are scanned, with the partiality definition store 720 and list 735 used to identify the pages that do not need to be included in the scan.

Note, it is possible to determine whether or not ordering is a requirement by the command issued on the request. For example an ordered SQL request would have the "by order" command associated therewith.

Further note, a hybrid of the systems disclosed with respect to FIGS. 5a and b and FIG. 6 may be used. This is useful in a system that typically does not require order but may require such on occasions. In this instance, a segmented index is maintained—see FIG. 5a. If ordering is specified then all segments are scanned before progressing to the actual stored data items themselves if the index does not reveal an appropriate record.

It will be appreciated that although the partiality definition store has been disclosed as holding a list of pages in the index. It may be convenient for some implementations to hold instead the list of pages not held in the index. This will require resulting minor differences to the processing described above. These differences will be readily appreciated by the skilled person and thus will not be discussed in detail herein.

It will be appreciated that the index may contain a reference to data items (e.g. messages, records) stored, or may contain the complete data item therein. Alternatively, the index may hold complete information for only some of the data items (e.g. short messages).

The base store (i.e. the queue of messages; the data records) may be held in non-volatile or volatile memory. Likewise the index and partiality definition store may be held in either volatile or non-volatile memory.

The flowchart and block diagrams of FIGS. 2-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

That which is claimed is:

1. A method for retrieving a data item from a data store in a data processing system, comprising:
    receiving a request for a data item from the data store;
    searching a partial index that at least partially indexes the data store; and
    searching an unindexed part of the data store using a partiality definition store in response to determining that the requested data item is not referenced by the partial index, wherein the partiality definition store is a pointer that distinguishes between a part of the data store that is indexed and a part of the data store that is not indexed.

2. The method of claim 1 wherein searching the data store using the partiality definition store in response to determining that the requested data item is not referenced by the partial index comprises adding the searched data items to the partial index.

3. The method of claim 2 further comprising maintaining a first indication in the partiality definition store of the last indexed data item.

4. The method of claim 3, wherein searching the data store using the partiality definition store in response to determining that the requested data item is not referenced by the partial index comprises searching data items subsequent to the last data item indicated by the first indication.

5. The method of claim 3, wherein the data store has an end part and wherein data items are added to the partial index as they are inserted into the end part, the method further comprising maintaining a second indication in the partiality definition store of the first inserted data item which is referenced in the partial index.

6. The method of claim 5, wherein searching the data store using the partiality definition store in response to determining that the requested data item is not referenced by the partial index comprises searching only data items present between the first and second indications.

7. The method of claim 5, wherein the partial index is segmented, a first segment comprises indexed data items prior to the first indication and the second segment comprises data items subsequent to the second indication, and wherein the method further comprises searching the data items in the data store between the first and second indications before searching the second index segment in response to determining that the next data item of a particular type is requested and that the data item is not referenced by the first segment.

8. The method of claim 1 further comprising deleting both the partiality definition store and the partial index in response to determining that the data store has fewer than a predetermined number of data items therein.

9. The method of claim 1, wherein data items are records held on pages in a database system and wherein the partiality definition store comprises a list of indexed pages, and wherein searching the data store using the partiality definition store in response to determining that the requested data item is not referenced by the partial index comprises using the partiality definition store and a list of all pages stored to search pages in the data store.

10. The method of claim 1, wherein data items are records held on pages in a database system and wherein the partiality definition store comprises a list of non-indexed pages, and wherein searching the data store using the partiality definition store in response to determining that the requested data item is not referenced by the partial index comprises deducing those pages that are indexed using the partiality definition store.

11. The method of claim 9, wherein the partial index is segmented with each segment comprising an index to at least one sequential page, and wherein the method further comprises interleaving the searching of index segments with searching of one or more pages in the data store in response to determining that the next data item according to a specific order of a particular type is requested.

12. The method of claim 9 further comprising retrieving a page based on a first indexed attribute and indexing the records held by the retrieved data page according to another attribute.

13. A system for retrieving a data item, the system comprising:
 a data store;
 a partial index, which partially indexes the data store;
 a partiality definition store being a pointer that distinguishes between a part of the data store that is indexed and a part of the data store that is not indexed;
 means for receiving a request for a data item from the data store;
 means for searching the partial index; and
 means for searching an unindexed part of the data store by using the partiality definition store to avoid searching a part of the data store which is known to be indexed in response to determining that the requested data item is not referenced by the partial index.

14. The system of claim 13 further comprising means for adding searched data items to the partial index while searching the data store.

15. The system of claim 14 further comprising means for maintaining a first indication in the partiality definition store of the last indexed data item.

16. The system of claim 15, wherein the means for searching the data store by using the partiality definition store to avoid searching a part of the data store which is known to be indexed in response to determining that the requested data item is not referenced by the partial index comprises means for searching data items subsequent to the last data item indicated by the first indication.

17. The system of claim 15, wherein the data store has an end part and wherein the system further comprises means for adding data items to the partial index as they are inserted into the end part and means for maintaining a second indication in the partiality definition store of the first inserted data item which is referenced in the partial index.

18. The system of claim 17, wherein the means for searching the data store by using the partiality definition store to avoid searching a part of the data store which is known to be indexed in response to determining that the requested data item is not referenced by the partial index comprises means for searching only data items present between the first and second indications.

19. The system of claim 17, wherein the partial index is segmented, a first segment comprises indexed data items prior to the first indication and the second segment comprises data items subsequent to the second indication, and wherein the system further comprises means for searching the data items in the data store between the first and second indications before searching the second index segment in response to determining that the next data item of a particular type is requested and that the data item is not referenced by the first segment.

20. The system of claim 13 further comprising means for deleting both the partiality definition store and the partial index in response to determining that the data store has fewer than a predetermined number of data items therein.

21. The system of claim 13, wherein data items are records held on pages in a database system and wherein the partiality definition store comprises a list of indexed pages, and wherein the means for searching the data store by using the partiality definition store to avoid searching a part of the data store which is known to be indexed in response to determining that the requested data item is not referenced by the partial index comprises means for using a list of all pages stored to search pages in the data store using the partiality definition store.

22. The system of claim 13, wherein data items are records held on pages in a database system and wherein the partiality definition store comprises a list of non-indexed pages, and wherein the means for searching the data store by using the partiality definition store to avoid searching a part of the data store which is known to be indexed in response to determining that the requested data item is not referenced by the partial index comprises means for using the partiality definition store to deduce those pages that are indexed.

23. The system of claim 21, wherein the partial index is segmented with each segment comprising an index to at least one sequential page, and wherein the system further comprises means for interleaving the searching of index segments with searching of one or more pages in the data store in response to determining that the next data item according to a specific order of a particular type is requested.

24. The system of claims 21 further comprising means for retrieving a page based on a first indexed attribute and means for indexing the records held by the retrieved data page according to another attribute.

25. A computer program product for retrieving a data item from a data store in a data processing system, the computer program product comprising a computer readable storage medium having stored therein computer readable program code, the computer readable program code comprising:
 computer readable program code configured to receive a request for a data item from the data store;
 computer readable program code configured to search a partial index that at least partially indexes the data store; and
 computer readable program code configured to search an unindexed part of the data store using a partiality definition store in response to determining that the requested data item is not referenced by the partial index, wherein the partiality definition store is a pointer that distinguishes between a part of the data store that is indexed and a part of the data store that is not indexed.

26. The computer program product of claim 25 wherein the computer readable program code configured to search the data store using the partiality definition store in response to determining that the requested data item is not referenced by the partial index comprises computer readable program code configured to add the searched data items to the partial index.

27. The computer program product of claim 26 further comprising computer readable program code configured to maintain a first indication in the partiality definition store of the last indexed data item.

28. The computer program product of claim 27, wherein the computer readable program code configured to search the data store using the partiality definition store in response to determining that the requested data item is not referenced by the partial index comprises computer readable program code configured to search data items subsequent to the last data item indicated by the first indication.

29. The computer program product of claim 27, wherein the data store has an end part and wherein data items are added to the partial index as they are inserted into the end part, and wherein the computer program product further comprises computer readable program code configured to maintain a second indication in the partiality definition store of the first inserted data item which is referenced in the partial index.

30. The computer program product of claim 29, wherein the computer readable program code configured to search the data store using the partiality definition store in response to determining that the requested data item is not referenced by the partial index comprises computer readable program code configured to search only data items present between the first and second indications.

31. The computer program product of claim 29, wherein the partial index is segmented, a first segment comprises indexed data items prior to the first indication and the second segment comprises data items subsequent to the second indication, and wherein the computer program product further comprises computer readable program code configured to search the data items in the data store between the first and second indications before searching the second index segment in response to determining that the next data item of a particular type is requested and that the data item is not referenced by the first segment.

32. The computer program product of claim 25 further comprising computer readable program code configured to delete both the partiality definition store and the partial index in response to determining that the data store has fewer than a predetermined number of data items therein.

33. The computer program product of claim 25, wherein data items are records held on pages in a database system and wherein the partiality definition store comprises a list of indexed pages, and wherein the computer readable program code configured to search the data store using the partiality definition store in response to determining that the requested data item is not referenced by the partial index comprises computer readable program code configured to use the partiality definition store and a list of all pages stored to search pages in the data store.

34. The computer program product of claim 25, wherein data items are records held on pages in a database system and wherein the partiality definition store comprises a list of non-indexed pages, and wherein the computer readable program code configured to search the data store using the partiality definition store in response to determining that the requested data item is not referenced by the partial index comprises computer readable program code configured to deduce those pages that are indexed using the partiality definition store.

35. The computer program product of claim 33, wherein the partial index is segmented with each segment comprising an index to at least one sequential page, and wherein the computer program product further comprises computer readable program code configured to interleave the searching of index segments with searching of one or more pages in the data store in response to determining that the next data item according to a specific order of a particular type is requested.

36. The computer program product of claim 33 further comprising computer readable program code configured to retrieve a page based on a first indexed attribute and computer readable program code configured to index the records held by the retrieved data page according to another attribute.

* * * * *